Oct. 17, 1939.　　　W. E. GUNDELFINGER　　　2,176,379
POWER ATTACHMENT FOR FOOD MIXERS
Filed June 27, 1938　　　2 Sheets-Sheet 1
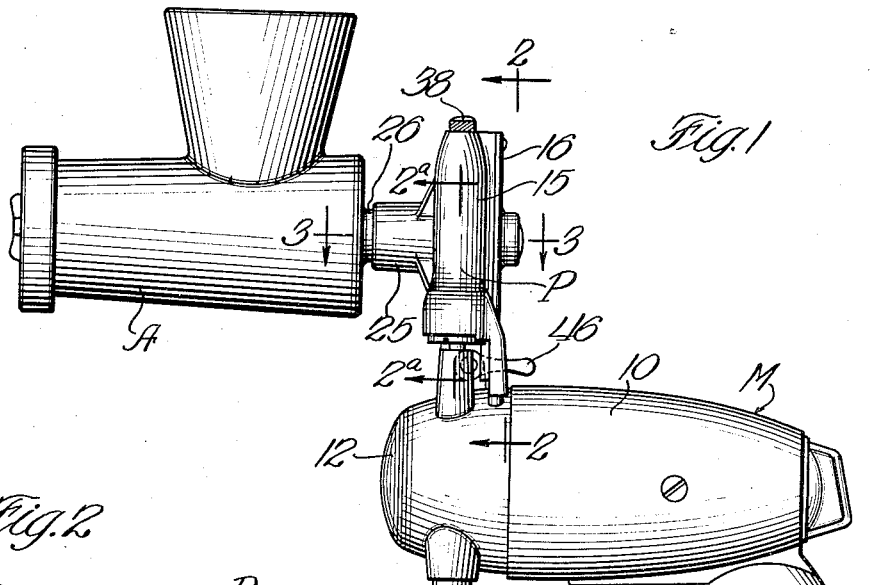
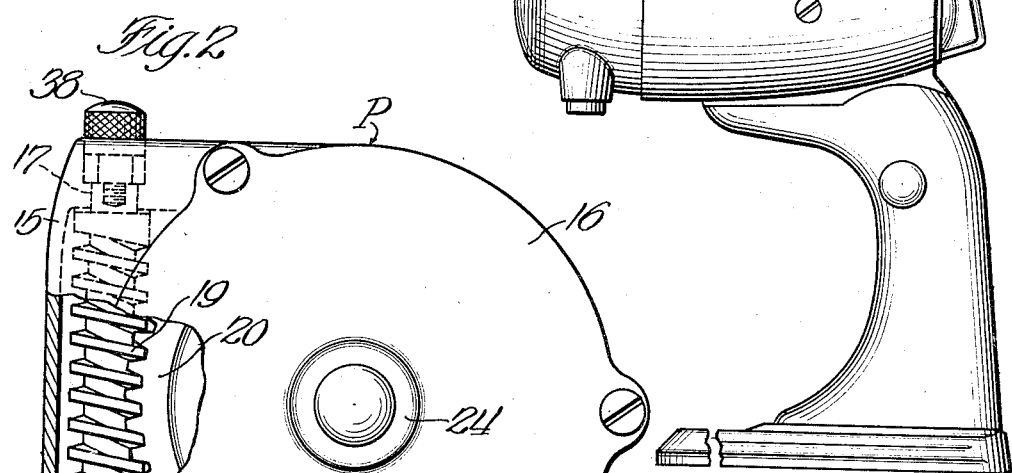
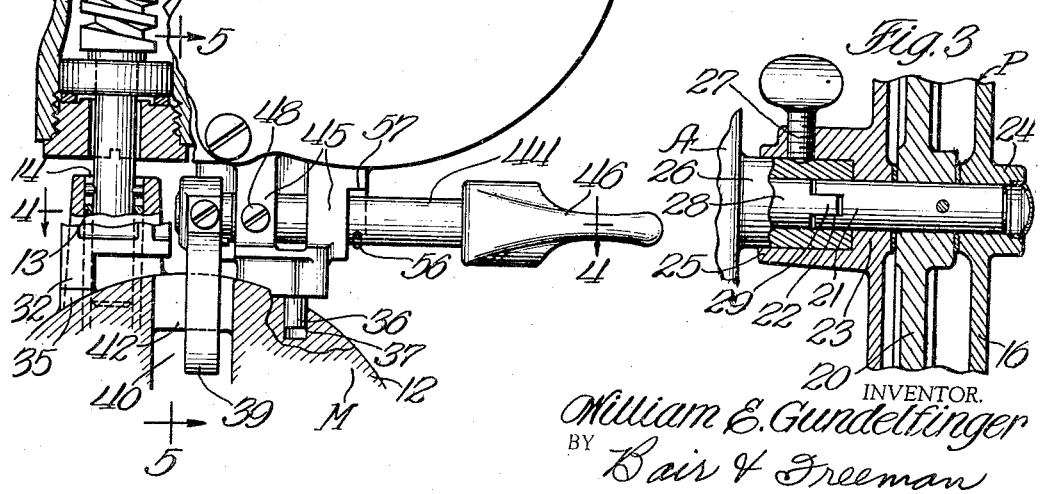
INVENTOR.
William E. Gundelfinger
BY Bair & Freeman
ATTORNEYS Oct. 17, 1939.   W. E. GUNDELFINGER   2,176,379
POWER ATTACHMENT FOR FOOD MIXERS
Filed June 27, 1938   2 Sheets-Sheet 2

INVENTOR.
William E. Gundelfinger
BY Bair & Freeman
ATTORNEYS

Patented Oct. 17, 1939

2,176,379

UNITED STATES PATENT OFFICE 2,176,379

POWER ATTACHMENT FOR FOOD MIXERS

William E. Gundelfinger, St. Louis, Mo., assignor to Knapp-Monarch Company, St. Louis, Mo., a corporation of Missouri Application June 27, 1938, Serial No. 216,057

8 Claims. (Cl. 74—16)

An object of my invention is to provide a simple and inexpensive power attachment for food mixers whereby a comparatively high speed drive shaft thereof may operate a power shaft for an implement at a considerably reduced rate of speed which implement, in turn, is attached to the power attachment.

More particularly it is my object to provide a power attachment which consists of a gear casing having suitable step down gearing connections between a driven shaft and a power shaft, the gear casing being provided with a novel and readily operable means for rigidly connecting it with a food mixer casing or motor casing of a mixer motor.

A further object is to provide the gear casing with means adapted to receive a hub of an implement such as a meat grinder, a set screw being provided for effecting rigid connection between the meat grinder and the gear casing whereby the meat grinder is rigidly supported relative to the mixer.

Another object is to provide means for accurately positioning the gear casing on the mixer casing so that a drive shaft of a mixer and a driven shaft of the gear casing are aligned with each other, means being provided to prevent rotation of the gear casing when the drive shaft rotates.

Still another object is to provide a rock shaft journaled in the gear casing and having an eccentric portion on which a latch is journaled, the latch being operable to draw the gear casing into rigid connection with the mixer casing, a handle being provided for oscillating the rock shaft and a projection of the rock shaft being engageable with the latch to swing it to unlatched position after the eccentric has been rotated to a position for releasing the latch.

Still a further object is to extend the driven shaft to the exterior of the gear casing and provide a manually operable knob thereon whereby the driven shaft can be rotated to a position for operative connection with the drive shaft of the mixer.

With these and other objects in view my power attachment consists in the construction, arrangement and combination of the various parts thereof, whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding thereof both from its structural and functional standpoints. Accordingly, I have illustrated a preferred and desirable embodiment of the invention in the accompanying drawings, in which:

Figure 1 is a side elevation of a food mixer, my power attachment attached thereto and a meat grinder connected with the power attachment.

Figure 2 is an enlarged sectional view on the line 2—2 of Figure 1 with portions of the power attachment sectioned on the line 2a—2a of Figure 1.

Figure 3 is an enlarged sectional view on the line 3—3 of Figure 1 showing how the meat grinder is supported relative to the gear casing of my power attachment.

Figure 4:
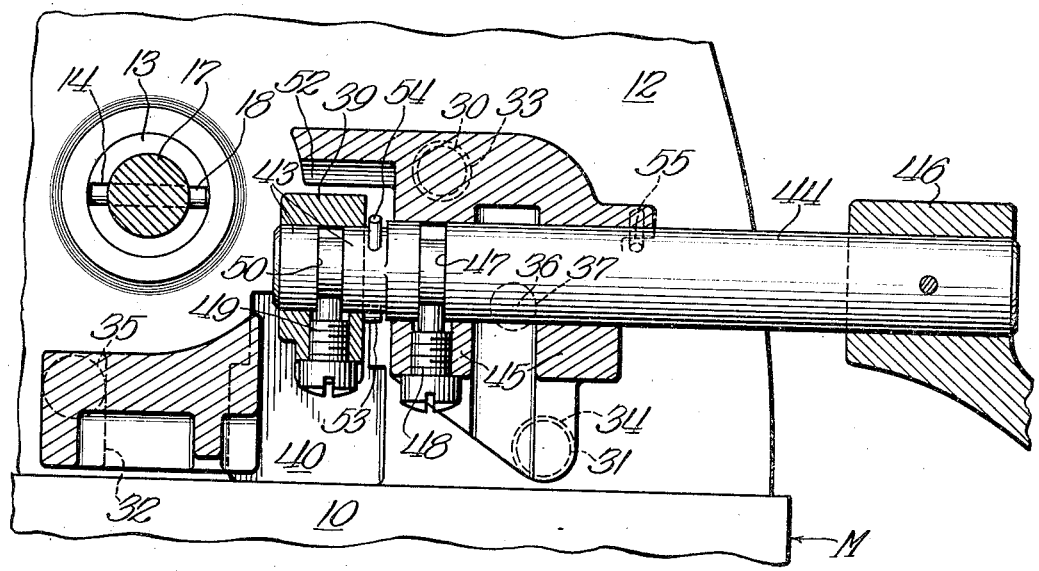
Figure 4 is an enlarged sectional view on the line 4—4 of Figure 2 showing a rock shaft for operating a latch of my structure.

On the accompanying drawings I have used the reference character M to indicate generally a mixer, P my power attachment therefor and A an implement operated by the power attachment. The mixer M has a casing consisting of parts 10 and 12 which enclose the mixer motor and also gearing mechanism of the usual construction (not shown) and which includes a tubular drive shaft 13. The drive shaft 13 is provided with a slot 14 for establishing an operative connection with the driven shaft of my power attachment as will hereinafter appear.

My power attachment comprises a gear casing 15 having a cover plate 16. Journaled in the gear casing 15 is a driven shaft 17 having a cross pin 18 for engagement in the slot 14 of the drive shaft 13. The driven shaft 17 has worm teeth 19 formed thereon which mesh with a worm gear 20. The worm gear 20 is pressed on and pinned and thereby secured to a power shaft 21 and is provided with a slot 22. The power shaft 21 is journaled in bearings 23 and 24 of the gear casing 15 and its cover plate 16 respectively as shown in Figure 3.

The gear casing 15 has a hollow hub 25 adapted to receive a hub 26 of the implement A. For rigidly securing the hub 26 within the hub 25 I provide a set screw 27. The implement A has an operating shaft 28 provided with a spline 29 adapted to enter the slot 22 of the power shaft 21 whereby the operating shaft and thereby the implement A is operatively connected with and driven by the power shaft.

The gear casing 15 is mounted on the mixer casing 12 and supported relative thereto by three projections 30, 31 and 32. The projections 30, 31 and 32 coact with bosses 33, 34 and 35 respectively extending from the mixer casing 12. This gives a three point support for the gear casing on the mixer casing.

To prevent rotation of the gear casing when the drive shaft 13 rotates, I provide a pin 36 which enters a socket 37 of the mixer casing 12 when the gear casing is mounted on the mixer casing. During the mounting operation in order to secure alignment of the cross pin 18 with the slot 14 I extend the upper end of the driven worm shaft 17 through the top of the gear casing 15 and mount a knurled knob 38 thereon. This knob can be manually engaged and rotated for registering the pin 18 with the slot 14 as the gear casing is mounted in position.

For retaining the gear casing in rigid connection with the mixer casing I provide a latch 39. This latch as illustrated in Figure 4 is located substantially centrally among the three supporting points at 30, 31 and 32 and is adapted for engagement with the mixer casing 12 by extension through an opening 40 therein. The lower end of the latch 39 is provided with a hook 41 engageable with an edge 42 of the opening 40 as shown in Figure 5.

The latch 39 is journaled on an eccentric portion 43 of a rock shaft 44. The rock shaft 44 is journaled in bearings 45 of the gear casing 15. A handle 46 is secured to the rock shaft 44 for manually rocking it.

To prevent longitudinal movement of the rock shaft 44 relative to the bearings 45 I provide a groove 47 in the rock shaft into which a projection in the form of a set screw 48 extends. Similarly, to retain the latch 39 on the eccentric portion 43 of the rock shaft, I provide a set screw 49 entering a groove 50 of the eccentric portion.

Figure 5:
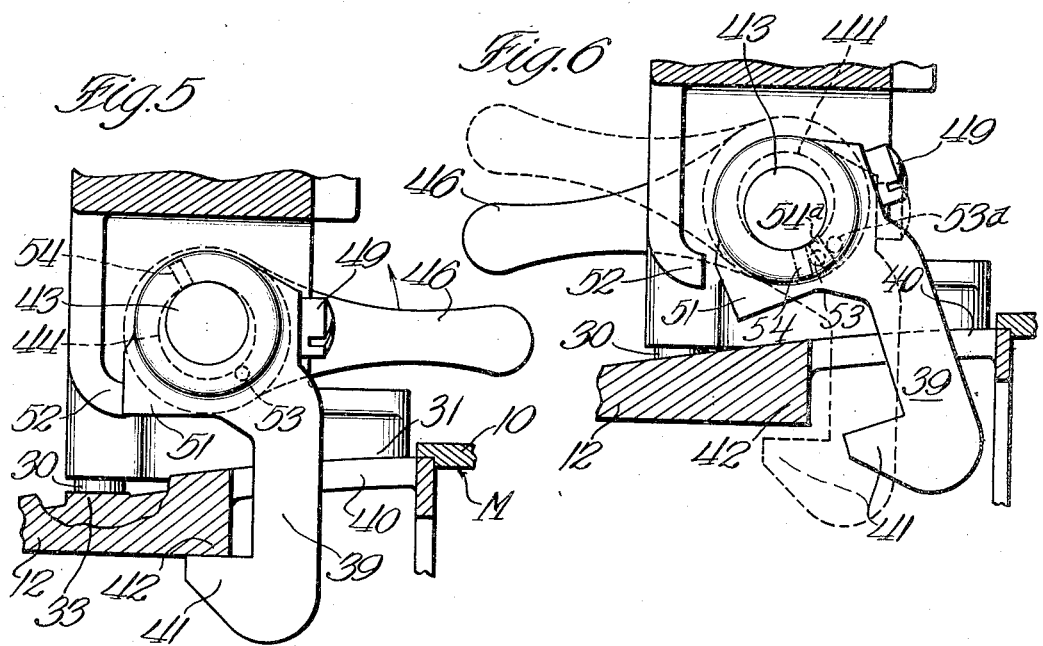
Figure 5 is an enlarged sectional view on the line 5—5 of Figure 2 showing the latch in latched position.

Referring to Figure 5 I show a boss 51 carried by the latch 39 and engageable with a flange 52 of the gear casing 15. This boss limits the latch in its swinging movement to the position shown.

I provide means for swinging the latch during a predetermined portion of the rocking movement of the rock shaft 44 consisting of a pin 53 projecting from the latch 39 and a pin 54 projecting from the eccentric portion 43. To limit rocking movement of the rock shaft 44 I provide a pin 55 engageable with shoulders 56 and 57 of the gear casing 15.

*Practical operation*

In the operation of my power attachment, when it is in position on a food mixer as shown in the drawings, the latch 39 is in the position shown in Figure 5 and the handle 46 is then in its locked position. It will be noted that the eccentric portion 43 of the rock shaft 44 is elevated in this position of the handle 46 thereby drawing the latch 39 upwardly relative to the gear casing 15 and the gear casing into rigid engagement with the mixer casing 12. The three point supporting arrangement surrounding the latch insures that the gear casing will be so mounted that any wobbling movement thereof relative to the mixer casing is entirely eliminated.

Figure 6:
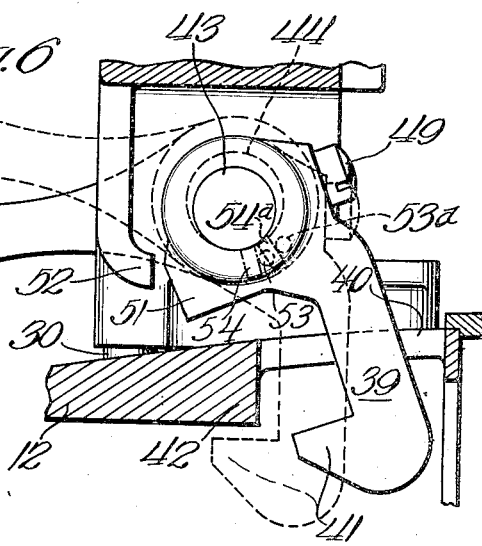
Figure 6 is a similar sectional view showing in dotted lines the latch in loosened position and in solid lines swung to a position permitting the removal of my power attachment from the mixer.

When it is desirable to remove the power attachment, the handle 46 is first rotated to the dotted position of Figure 6 thus releasing the hook 41 of the latch 39 from the edge 42 of the opening 40 due to the eccentric 43 being in lowered position relative to the position shown in Figure 5. It will be obvious that any upward movement of the gear casing will now be prevented by the hook 41. The handle 46 is thereupon rotated to the solid line position which causes the pin 54 to assume the position indicated as 54a and thereby swing the pin 53 to the position indicated as 53a and thereby the latch 39 to the solid line position so that the hook 41 is located in the opening 40. The power attachment can thereafter be lifted off the mixer without the hook 41 interfering with its removal therefrom.

In mounting the power attachment on the mixer, the driven shaft 17 is inserted into the tubular drive shaft 13 and the pin 36 is inserted into the socket 37. The gear casing is then moved downwardly. At the same time the knob 38 is rotated so that registry of the pin 18 with the slot 14 can be secured during such downward movement. When the pin snaps into the slot, the operator is insured of proper connection between the drive and driven shafts.

The handle 46 may now be swung to the dotted position of Figure 6 which permits the hook 41 to assume its proper position under the edge 42 of the opening 40 with the stop pin 51 against the flange 52. Further swinging of the handle 46 to the position of Figure 5 will cause the eccentric to operate for effecting latching of the gear casing on the mixer casing and to insure a rigid and tight connection between the two which will not become loosened due to the vibration caused by subsequent operation of the motor. A meat grinder such as shown at A or any other implement can now be connected with the gear casing in the manner illustrated in Figure 3.

Some changes may be made in the construction and arrangement of the parts of my device without departing from the real spirit and purpose of my invention, and it is my intention to cover by my claims, such modified forms of structure or use of mechanical equivalents as may be reasonably included within their scope.

I claim as my invention:

1. Means for attaching a gear casing to a food mixer or the like having a drive shaft and an opening in the casing of said mixer adjacent said drive shaft comprising a latch carried by said gear casing and engageable in said opening to retain said gear casing on said mixer casing, means of engagement between said casings at three points arranged surrounding said latch to predetermine the position of said gear casing relative to said mixer casing and means of engagement between said casings at a point spaced from the axis of said driven shaft to prevent rotation of said gear casing relative to said mixer casing when said drive shaft rotates.

2. Means for attaching a gear casing to a food mixer having an opening therein comprising a latch carried by said gear casing and engageable in said opening to retain said gear casing on said food mixer casing, and means of engagement between said casings at three points arranged surrounding said latch to predetermine the position of said gear casing relative to said mixer casing.

3. Means for attaching a gear casing to a motor casing having a drive shaft and an opening in the motor casing comprising a latch carried by said gear casing and engageable in said opening, an eccentric for tightening said latch to retain said gear casing rigidly on said motor casing, said gear casing coacting with said motor casing at a point radially spaced from said drive shaft to prevent rotation of said gear casing when said drive shaft rotates.

4. Means for attaching a gear casing to a food mixer comprising a latch carried by said gear casing and engageable with said mixer to retain said gear casing thereon, an operating shaft for said latch journaled on said gear casing, said operating shaft having an eccentric portion on which said latch is journaled said shaft and said portions being provided with annular grooves, means of engagement between said shaft and latch to swing said latch to unlatched position after said eccentric has been rotated to a position releasing the latch from said food mixer, and a handle on said operating shaft for manually oscillating the same and set screws carried by said gear casing and by said latch and fitting in said annular grooves to permit rotation and prevent longitudinal movement of said shaft and latch relative to said gear casing and shaft respectively.

5. Means for attaching a gear casing having a driven shaft journaled therein to a motor casing having a drive shaft and an opening in the motor casing comprising a latch carried by said gear casing and engageable in said opening to retain said gear casing on said motor casing, said driven shaft having means of operative connection with said drive shaft when said casings are so connected, said driven shaft having an extension to the exterior of said gear casing and a manually engageable knob thereon for rotating said driven shaft to a registering position with said drive shaft.

6. In a power attachment for food mixers, a gear casing, a power shaft and a driven shaft journaled therein, operative connections in said gear casing between said shafts, said gear casing being adapted for attachment to a food mixer having a drive shaft, means to retain said gear casing on said mixer, said driven shaft having means of operative connection with said drive shaft when said casings are so connected, said driven shaft having an extension to the exterior of said gear casing and a manually engageable knob thereon for rotating said driven shaft to a position registering with said drive shaft.

7. Means for attaching a gear casing to a food mixer having a drive shaft and an opening in the casing of said mixer comprising a rock shaft journaled in said gear casing, an annular groove therein, a projection from said gear casing and into said groove to retain said rock shaft against longitudinal movement, an eccentric portion on said rock shaft having an annular groove therein, a latch journaled on said eccentric portion, said latch having a projection in said last groove and hook engageable with the edge of said opening in said mixer casing and operable to draw said gear casing into rigid engagement with said mixer casing when said rock shaft is rotated in one direction.

8. Means for attaching a gear casing to a food mixer comprising a rock shaft journaled in said gear casing, a handle for rocking said rock shaft, said rock shaft having an eccentric portion, a latch journaled thereon for engagement with said food mixer and operable to draw said gear casing into supported engagement therewith by rotation of said rock shaft, and a pin projecting radially from said rock shaft and engageable with said latch to impart swinging movement thereto upon rotation of said rock shaft through a predetermined portion of its rocking movement to unhook the latch from the gear casing.

WILLIAM E. GUNDELFINGER.